Nov. 21, 1933.  E. W. DAVIS  1,935,873
LUBRICATING APPARATUS
Filed May 9, 1930  3 Sheets-Sheet 1
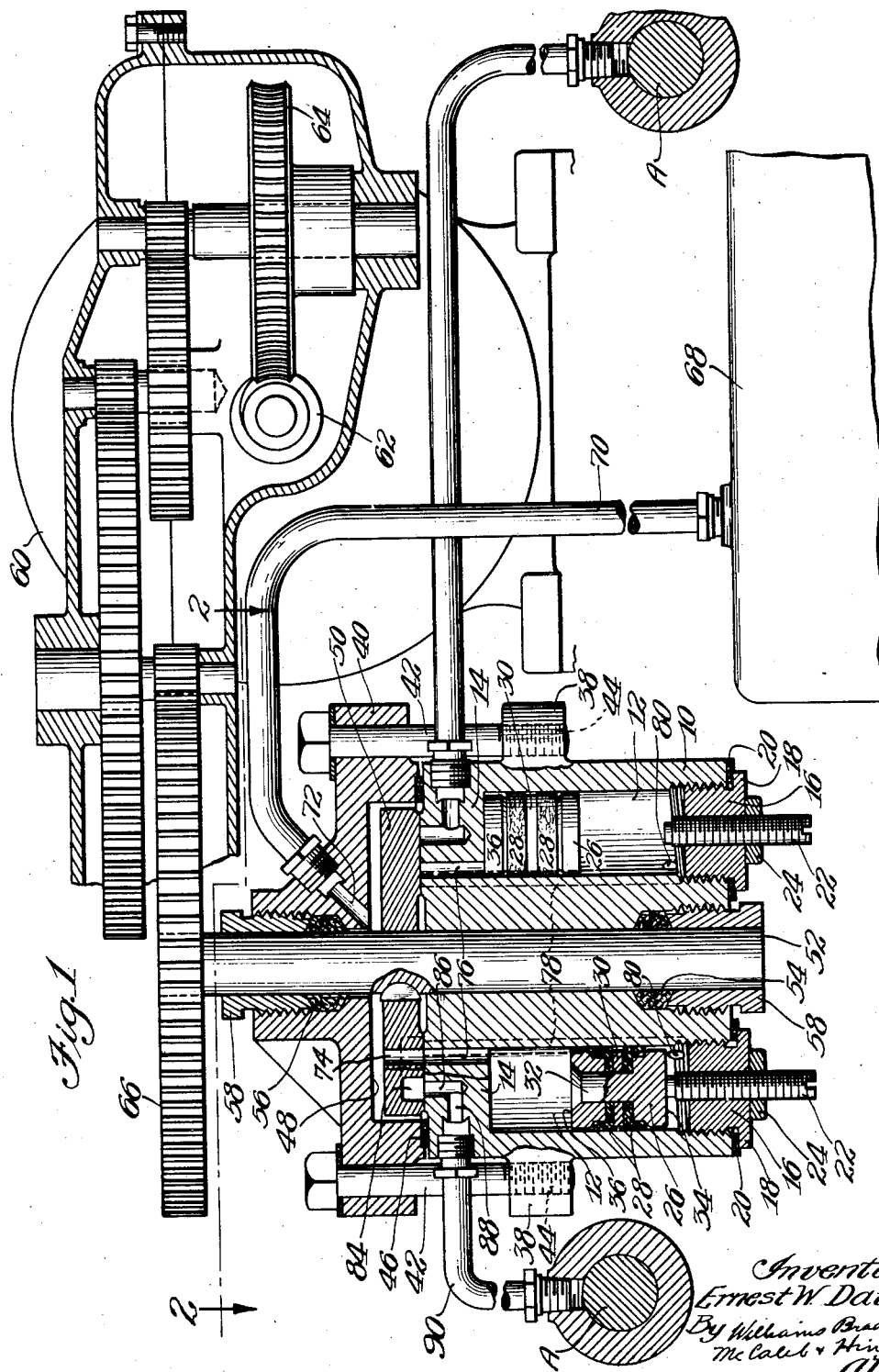

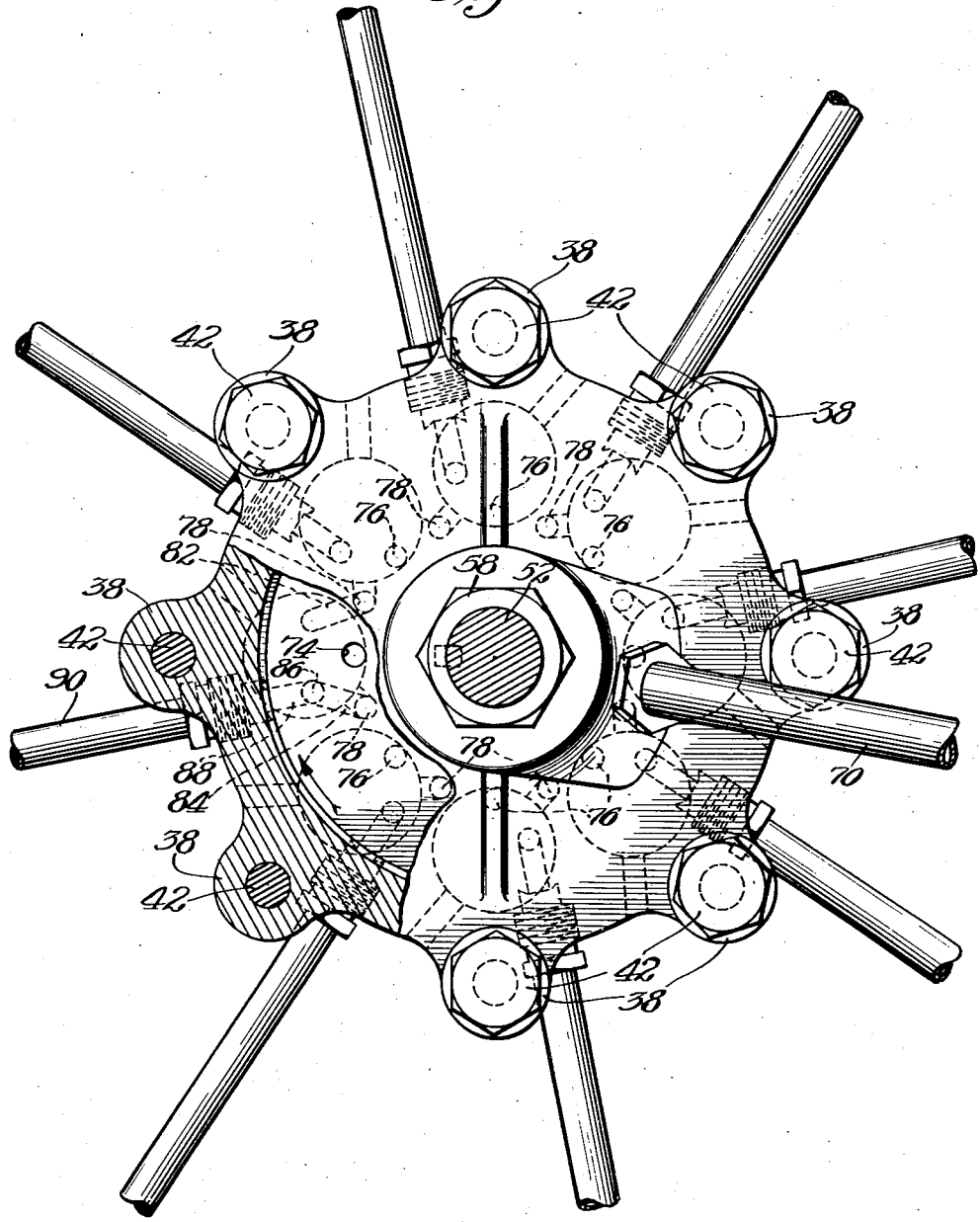

Nov. 21, 1933.  E. W. DAVIS  1,935,873
LUBRICATING APPARATUS
Filed May 9, 1930  3 Sheets-Sheet 3
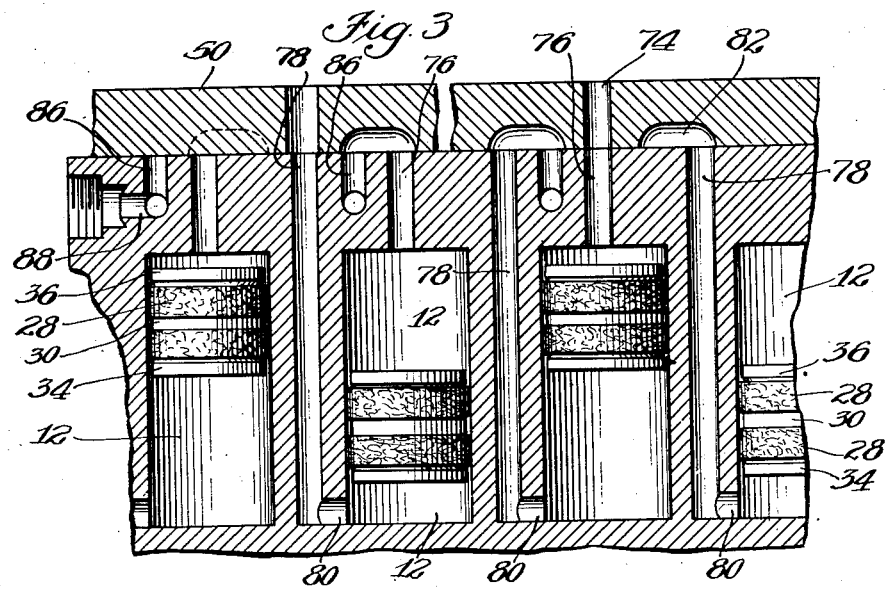
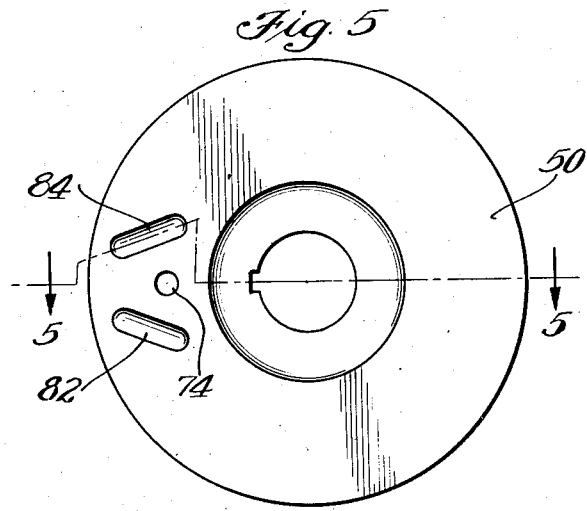
Inventor:
Ernest W. Davis
By Williams, Bradbury, McCaleb & Hinkle
Attys.

Patented Nov. 21, 1933

1,935,873

UNITED STATES PATENT OFFICE 1,935,873

LUBRICATING APPARATUS

Ernest W. Davis, Oak Park, Ill., assignor to Alemite Corporation, Chicago, Ill., a corporation of Delaware Application May 9, 1930. Serial No. 450,893

10 Claims. (Cl. 184—7)

My invention relates to lubricating apparatus and more particularly to a multiple metering or charge measuring device adapted to force lubricant to the bearings to be lubricated under pressure.

The device of my invention is particularly adapted for use in steel mills and other places where it is desired to lubricate heavy machinery, and machinery which requires a very heavy grade of lubricant, with the assurance that each bearing will receive its positive measured charge of lubricant.

It is an object of my invention to provide a device of the type specified which will receive lubricant under pressure from a suitable reservoir and which will segregate measured quantities of the lubricant and force the lubricant to the bearings to be lubricated at regular intervals.

A further object of my invention is to provide a device of the type specified capable of supplying a plurality of bearings with unequal quantities of lubricant and further capable of segregating the desired amounts of lubricant for each bearing and forcing the lubricant to the bearing.

It is a further object of the invention to provide an improved charge measuring device provided with adjusting means for varying the amount of lubricant to be fed to the bearings.

A further object of the invention is the provision of an improved multiple measuring valve mechanism provided with means adapted to be changed to alter the time interval between the lubricating periods.

Another object of the invention is the provision of visible means which indicate the amount of lubricant measured by each valve.

Other objects and advantages will be more apparent from the following description, reference being had to the accompanying drawings, in which:

Fig. 1 is a somewhat diagrammatic side view of the improved multiple measuring device and associated parts, partly broken into section to more clearly show other parts;

Fig. 2 is a plan sectional view taken generally on line 2—2 of Fig. 1;

Fig. 3 is a somewhat diagrammatic view of the cylinders and plungers of the measuring valve;

Fig. 4 is a cross-sectional view of the disc valve, and

Fig. 5 is a bottom plan view thereof.

In the drawings, I have shown a multiple chamber housing 10, provided with a plurality of cylindrical bores 12 open at their lower ends and closed at their upper ends by the wall 14. The lower ends of the cylinders are screw threaded and closed by closure members 16 which have a lateral flange 18 that compresses a gasket 20 interposed between the flange and the lower edge of the valve housing. An adjusting member 22 is screw threadedly mounted in closure member 16 and a lock nut 24 is provided to lock the adjusting member in any desired position.

Reciprocating plungers 26 are provided in bores 12 and each plunger is provided with oppositely facing cup washers 28 separated by a face plate 30 and mounted on a stud 32. Stud 32 has an enlarged head portion 34 adapted for use as a limit stop for the plunger 26 and a similarly shaped limit stop portion 36 is fastened on the opposite side of the plunger on stud 32, the stud being riveted over to securely fasten all the parts of the plunger together to form an integral unit.

The multiple chamber housing 10 has lugs 38 formed integral therewith. A chamber housing cover 40 is secured to the chamber housing by bolts 42 which are screw threaded into tapped holes 44 in lugs 38. An annular ring gasket 46 is interposed between the valve housing and the cover to form a fluid-tight seal therebetween. A valve chamber 48 is formed in cover 40 and a disc valve 50 is positioned therein. Valve 50 is keyed to a drive shaft 52 that is vertically positioned in housing 10. A pair of gaskets 54 and 56 are placed around shaft 52 to prevent any leakage of lubricant along the shaft, one near the lower end of the housing 10 and one near the upper end of cover 40, each having a follower 58.

Means for driving valve shaft 52 may be provided in the form of a motor 60, which, through the medium of worm gear 62, worm wheel 64 and intermediate gearing, drives a face gear 66 keyed to the upper end of shaft 52. It will be noted that through the gearing shown a slow rotary motion is transmitted to the disc valve 50.

Lubricant under pressure is stored in a tank 68 from whence it flows to valve chamber 48 through the conduit 70 and passageway 72. Disc valve 50 has a vertical aperture 74 which is adapted, upon rotation of the disc, to coincide with passageways 76 through wall 14 of the housing 10 that communicate with the upper ends of cylinders 12, and with passageways 78 that communicate with the lower ends of cylinders 12 through openings 80. Disc valve 50 has a pair of horizontally placed recesses 82 and 84 in its lower face so arranged that in one position communication is established between valve chamber 48, through aperture 74, and passageway 76, with the upper end of cylinders 12 and communication is established between the lower end of cylinders 12, through opening 80, passageway 78, recess 84 in the valve 50, down through passageways 86 and 88 into a conduit 90 which may be connected to a bearing A in any suitable manner. While the valve is in this position it is evident that lubricant will flow from tank 68 into valve chamber 48, through the valve, and into cylinder 12, forcing plunger 26 down to its lower limit and forcing lubricant in the cylinder below the plunger out through opening 80, passageway 78, recess 84 of the valve, passageways 86 and 88, and conduit 90, into the bearing A.

Further rotary movement of valve 50 will bring aperture 74 into alignment with the next passageway 78 and lubricant will flow through opening 80 into the lower end of cylinder 12, forcing the plunger upward and forcing lubricant into the upper portion of the cylinder out through passageway 76, recess 82 and passageways 86 and 88 and conduit 90 to the next bearing. In this position recess 84 of the valve overlies the preceding cylinder and is not in communication with any openings.

Further rotary movement of valve 50 will bring aperture 74 into communication with the upper end of a cylinder 12 and the lower end of the cylinder 12 into communication with a conduit 90 which leads to a bearing A to be lubricated.

In Fig. 3 of the drawings the two different conditions have been illustrated, that is, where aperture 74 communicates through aperture 76 with the top of cylinder 12 and where aperture 74 communicates through passageways 78 and 80 with the lower end of the cylinder.

The amount of lubricant which it is desired to force to a given bearing may readily be determined and the capacity of cylinders 12 adjusted by the adjusting member 22 and it is evident that the length of member 22 projecting below the valve housing is a visible means to indicate the capacity of each particular cylinder.

While it is evident that the speed at which the disc valve 50 is rotated may be increased or decreased to meet the prevailing conditions, I have found that a very satisfactory rate of speed at which the valve rotates is about eight to ten times per minute. It is further evident that any other form of drive that is desired may be adopted to rotate the disc valve.

While I have illustrated a preferred embodiment of my invention, many modifications may be made without departing from the spirit of my invention, and I do not wish to be limited to the precise details of construction set forth, but desire to avail myself of all changes within the scope of the appended claims.

Having thus described my invention, what I claim is new and desire to secure by Letters Patent of the United States is:

1. A multiple charge measuring device comprising a valve housing having chambers therein, a cover, an inlet conduit extending into said housing, a disc valve rotatably mounted in said housing above said chambers, reciprocating plungers in the chambers, outlet conduits extending from said housing, and means for moving the valve to connect the inlet alternately with one end of a measuring chamber and then with another.

2. Lubricating apparatus including a source of lubricant under pressure, a housing having a plurality of measuring chambers therein, reciprocable plungers in said measuring chambers, unitary indicating means for varying the charge measuring capacity of said chambers, conduits extending from said housing to bearings to be lubricated, and a single disc valve mechanism in said housing for connecting the source of lubricant with one side of one of said chambers to force lubricant from the other side of said chamber to one of said bearings.

3. Apparatus for supplying lubricant to bearings including a source of lubricant under pressure, a housing comprising a plurality of measuring chambers having passageways extending from opposite ends of said chambers, a movable wall in each of said chambers intermediate the ends thereof, a conduit connecting said source with said housing, unitary valve means associated with said housing interposed between said conduit and said passageways, and adapted upon actuation to connect said conduit consecutively with one end and then with the other end of one of each of said measuring chambers, and with each chamber in succession.

4. In apparatus of the class described, the combination of a source of lubricant under pressure, a plurality of bearings to be lubricated, conduits connecting said source and said bearings with a valve housing, a cylinder in said housing for each of said bearings to be lubricated, a power operated valve mechanism associated with said cylinders, and slidable means positioned within each of said cylinders, said valve mechanism upon operation being adapted consecutively to connect said cylinders on opposite sides of said means to said source and said bearings.

5. Lubricating apparatus, including a source of lubricant under pressure, comprising a valve housing, a conduit connecting said housing with said source, a plurality of bearings to be lubricated, conduits connecting each of said bearings with said housing, a distributing valve, a measuring cylinder for each of said bearings, and a piston in each of said cylinders, said distributing valve being adapted to connect each of said cylinders to the conduit leading to the source of lubricant at the same time it connects the opposite end of said cylinder to the conduit leading to a bearing and to so connect each of said measuring valves consecutively.

6. In combination, a plurality of measuring cylinders, a floating piston in each of said cylinders, a plurality of conduits, one associated with each of said cylinders and each leading to a part to be lubricated, a source of lubricant under pressure, and a valve constructed and arranged alternately to connect said source with the opposite ends of each of said cylinders successively and simultaneously therewith connect the other ends respectively of each of said cylinders successively with its associated conduit.

7. In combination, a plurality of measuring cylinders, a movable wall in each of said cylinders separating the ends thereof, a plurality of conduits one associated with each of said cylinders and each conduit leading to a part to be lubricated, a source of lubricant under pressure, and a rotary valve constructed and arranged alternately to connect said source with the opposite ends of each of said cylinders successively and simultaneously therewith connect the other ends respectively of each of said cylinders successively with its associated conduit.

8. In combination, a plurality of measuring cylinders, a movable wall in each of said cylinders separating the ends thereof, a plurality of conduits one associated with each of said cylinders and leading to a part to be supplied with lubricant, a source of lubricant under pressure, a valve constructed and arranged alternately to connect said source with the opposite ends of each of said cylinders successively and simultaneously therewith to connect the other ends respectively of each of said cylinders successively with its associated conduit, and adjustable means for limiting the extent of movement of said movable wall.

9. An automatic lubricating device including a housing having a plurality of measuring chambers, and a plurality of passageways leading from each of said chambers, a movable wall in each of said chambers intermediate the ends thereof and separating each chamber into two compartments, a conduit connecting said housing with a source of lubricant under pressure, a plurality of conduits connecting said housing with bearings to be lubricated, and a disc valve interposed between said conduits and said measuring chambers and adapted alternately to connect the opposite ends of said chambers with the conduit leading from said source of lubricant under pressure and with a conduit leading to a bearing respectively, said valve making the aforesaid connections with said chambers in succession.

10. An automatic lubricating device including a housing having a plurality of measuring chambers and a plurality of passageways leading from each of said chambers, a movable wall in each of said chambers intermediate the ends thereof and separating each chamber into two compartments, a conduit connecting said housing with a source of lubricant under pressure, a plurality of conduits connecting said housing with bearings to be lubricated, a disc valve interposed between said conduits and said measuring chambers and adapted alternately to connect the opposite ends of said chambers with the conduit leading from said source of lubricant under pressure and with a conduit leading to a bearing respectively, said valve making the aforesaid connections with said chambers in succession, and individually adjustable means for limiting the extent of movement of the movable walls in each of said measuring chambers.

ERNEST W. DAVIS.